(12) United States Patent
Park et al.

(10) Patent No.: US 10,593,344 B2
(45) Date of Patent: Mar. 17, 2020

(54) SOUND SOURCE LOCALIZATION METHOD AND SOUND SOURCE LOCALIZATION APPARATUS BASED COHERENCE-TO-DIFFUSENESS RATIO MASK

(71) Applicant: SOGANG UNIVERSITY RESEARCH FOUNDATION, Seoul (KR)

(72) Inventors: Hyung Min Park, Seoul (KR); Ran Lee, Seoul (KR)

(73) Assignee: SOGANG UNIVERSITY RESEARCH FOUNDATION, Seoul (KR)

( * ) Notice: Subject to any disclaimer, the term of this patent is extended or adjusted under 35 U.S.C. 154(b) by 0 days.

(21) Appl. No.: 16/255,112

(22) Filed: Jan. 23, 2019

(65) Prior Publication Data

US 2019/0228790 A1 Jul. 25, 2019

(30) Foreign Application Priority Data

Jan. 25, 2018 (KR) .................. 10-2018-0009446

(51) Int. Cl.
*G10L 21/0232* (2013.01)
*H04R 3/04* (2006.01)
*H04R 3/00* (2006.01)
*H04R 5/027* (2006.01)
*H04S 7/00* (2006.01)
(Continued)

(52) U.S. Cl.
CPC ........ *G10L 21/0232* (2013.01); *G01S 3/8006* (2013.01); *G01S 3/8083* (2013.01); *H04R 3/005* (2013.01); *H04R 3/04* (2013.01); *H04R 5/027* (2013.01); *H04R 5/04* (2013.01); *H04S 7/303* (2013.01); *G10L 21/0208* (2013.01);
(Continued)

(58) Field of Classification Search
CPC ....... G10L 21/0232; G10L 2021/02082; G10L 2021/02166; H04R 3/005; H04R 3/04; H04R 5/027; H04R 5/04; H04S 7/303
USPC ......................................... 381/73.1
See application file for complete search history.

(56) References Cited

U.S. PATENT DOCUMENTS

2011/0038489 A1* 2/2011 Visser .................. G01S 3/8006
                                                             381/92
2017/0330580 A1* 11/2017 Wolff .................. G10L 21/0208
(Continued)

FOREIGN PATENT DOCUMENTS

KR    20050110790    11/2005
KR    20110097296    8/2011
KR    20130011382    1/2013

*Primary Examiner* — Ahmad F. Matar
*Assistant Examiner* — Sabrina Diaz
(74) *Attorney, Agent, or Firm* — Cantor Colburn LLP

(57) ABSTRACT

Provided is a sound source localization method including steps of: (a) receiving a mixed signal of a target sound source signal and noise and echo signals through multiple microphones including at least two microphones; (b) generating a binarized mask based on a diffuseness by using a coherence-to-diffuseness ratio CDR, which is information on the target sound source and the noise source, by using the input signal; (c) pre-processing an input signal to multiple microphones by using the generated binarized mask; and (d) performing a predetermined algorithm such as the GCC-PHAT or the SRP-PHAT on the pre-processed input signal to estimate a direction of the target sound source.

11 Claims, 7 Drawing Sheets

(51) Int. Cl.
*H04R 5/04* (2006.01)
*G01S 3/80* (2006.01)
*G01S 3/808* (2006.01)
G10L 21/0208 (2013.01)
G10L 21/0216 (2013.01)

(52) U.S. Cl.
CPC ............... *G10L 2021/02082* (2013.01); *G10L 2021/02166* (2013.01)

(56) References Cited

U.S. PATENT DOCUMENTS

2018/0268838 A1* 9/2018 Faubel ...................... G06F 3/01
2018/0299527 A1* 10/2018 Helwani ............... G01S 3/8006

* cited by examiner

SOUND SOURCE LOCALIZATION METHOD AND SOUND SOURCE LOCALIZATION APPARATUS BASED COHERENCE-TO-DIFFUSENESS RATIO MASK

BACKGROUND OF THE INVENTION

1. Field of the Invention

The present invention relates to a sound source localization method, and more particularly, to a sound source localization method and a sound source localization apparatus robust to echo and diffusive noise by estimating a direction of a target sound source based on a cross correlation method by applying a diffuseness mask generated by using a coherence-to-diffuseness power ratio (CDR) for a mixed signal input from multiple microphones in a noise and echo environment.

2. Description of the Related Art

Recently, with the rapid development of artificial intelligence, interest in artificial intelligent speech recognition is increasing. As a result, artificial intelligent speech recognition speakers become popular, and thus, there is a problem in that performance of speech recognition deteriorates in environments where the noise exists at a long distance. Therefore, it is required to develop sound source localization technology that guarantees accurate performance in the environment where echo and noise exist.

In a case of using multiple microphones, the arrival time of the signal of the sound source for each microphone differs depending on the direction of the sound source when the sound source is input to the microphone. Therefore, it is possible to determine the direction of the sound source by estimating the difference in the arrival time of each microphone.

A cross-correlation-based sound source localization method is most widely used as a sound source localization algorithm to detect the location of a sound source. The cross-correlation-based sound source localization method has advantages of stable performance and capability of estimating directions of multiple sound sources. However, cross correlation value increases in all directions in the environment where noise or echo exist, and thus, the cross-correlation-based sound source localization method has disadvantages in that the performance of the sound source localization deteriorate. In other words, most cross-correlation based methods become very inaccurate in a case where there is additive noise distortion due to ambient noise sources, or in a case where straight path components are reflected by echo and mixed with the original signal. In particular, when there is distortion due to echo components, the direct path component that existed at the previous time is delayed and attenuated due to the reflection in the space and mixed with the present signal, and the correlation with the direct path component is high. Therefore, a separate algorithm other than the noise removal is required. Techniques for improving the performance in these environments have been developed, but most of the techniques have exhibited limited improvement of the performance, and a large amount of data and a large amount of computation have been demanded to improve the accuracy Therefore, a stable, accurate sound source localization technology is needed to improve the performance of the speech recognition in the environment where noise and echo exist.

Hereinafter, prior to describing the sound source localization method according to the present invention, sound source localization algorithms in the related art will be described below.

<Generalized Cross Correlation Method>

FIG. 1 is a graph illustrating time delays in which sound signals from a sound source in a spherical coordinate system arrives at multiple microphones according to angles. Referring to FIG. 1, when a target sound source exists in a direction $(r_s, \phi_s, \theta_s)$ in a long distance, $x_2(t)$, which is a signal of a second microphone among signals incoming to two microphones in a noise environment, is expressed as Mathematical Formula 1.

$$x_2(t) = \alpha_2(r_s, \phi_s, \theta_s)s[t - f_{12}(r_s, \phi_s, \theta_s)] + v_m(t) \quad \text{[Mathematical Formula 1]}$$

Herein, $x_m(t)$ is the input signal incoming to the microphone, $s(t)$ and $v_m(t)$ represent an original signal and an additive noise, respectively, and $\alpha_m$ is a degree of attenuation of the original signal. $f_{12}$ is a relative time delay between the first microphone and the second microphone, depending on the position of the sound source. $f_{12}$ can be expressed by Mathematical Formula 2.

$$f_{12}(r_s, \phi_s, \theta_s) = \frac{1}{c}[d_{s,1}(r_s, \phi_s, \theta_s) - d_{s,2}(r_s, \phi_s, \theta_s)] \quad \text{[Mathematical Formula 2]}$$

Herein, c is a speed of sound, and d is a distance between the sound source s and each microphone.

Herein, a sample delay $\tau$ that can occur between the first microphone and the second microphone is expressed as Mathematical Formula 3. In Mathematical Formula 3, "round" denotes reduction of an estimated value to a measurable sample delay unit.

$$\tau = \text{round}[f_{12}(r_s, \phi_s, \theta_s)] \quad \text{[Mathematical Formula 3]}$$

It can be understood from the input signal incoming to the multiple microphones with reference to Mathematical Formula 1 that the signal input to the reference microphone is attenuated and delayed in the second microphone. Thus, when delay compensation corresponding to the time delay $\tau$ between the two microphones is achieved, it can be expected that the cross correlation value between the two microphones will be maximized. FIG. 2 is a diagram illustrating cross correlation values when delay compensation is performed.

The cross correlation value between signal $x_1(t)$ and $x_2(t)$ of the two microphones is expressed as Mathematical Formula 4, and the Fourier trans form of cross correlation value to the frequency domain is expressed as Mathematical Formula 5.

$$c_{12}(\tau) = \int_{-\infty}^{+\infty} x_1(t) x_2(t+\tau) dt \quad \text{[Mathematical Formula 4]}$$

$$c_{12}(\omega) = \int_{-\infty}^{+\infty} c_{12}(\tau) e^{-j\omega\tau} d\tau \quad \text{[Mathematical Formula 5]}$$

When $\omega = 2\pi f$, from Mathematical Formulas 4 and 5 and the feature of the convolution in the Fourier transform, Mathematical Formula 6 can be obtained.

$$c_{12}(\omega) = X_1(\omega) X'_2(\omega) \quad \text{[Mathematical Formula 6]}$$

Herein, $X_1(\omega)$ is the Fourier transform equation of $x_1(t)$, and $X'_2(\omega)$ is the conjugate complex of the Fourier transform equation of $x_2(t)$.

By performing inverse Fourier transform on this again, as in Mathematical Formula 7, the equation for the cross correlation value, in which the time delay of $\tau$ is compensated for at the input of the original microphone can be obtained.

$$c_{12}(\tau) = \frac{1}{2\pi}\int_{-\infty}^{+\infty} X_1(\omega)X'_2(\omega)e^{j\omega\tau}\,d\omega \quad \text{[Mathematical Formula 7]}$$

Based on the cross correlation value of Mathematical Formula 7, the cross correlation values for the signals $x_1(t)$ and $x_2(t)$ passing through filter $H_1(\omega)$ and $H_2(\omega)$, respectively, can be defined as Mathematical Formulas 8 to 10.

$$R_{12}(\tau) = \frac{1}{2\pi} \int_{-\infty}^{+\infty} (H_1(\omega)X_1(\omega))(H_2(\omega)X_2(\omega))e^{j\omega\tau}\,d\omega \quad \text{[Mathematical Formula 8]}$$

$$R_{12}(\tau) = \frac{1}{2\pi}\int_{-\infty}^{+\infty} H_1(\omega)H'_2(\omega)X_1(\omega)X'_2(\omega)e^{j\omega\tau}\,d\omega \quad \text{[Mathematical Formula 9]}$$

$$R_{12}(\tau) = \frac{1}{2\pi}\int_{-\infty}^{+\infty} \psi_{12}(\omega)X_1(\omega)X'_2(\omega)e^{j\omega\tau}\,d\omega \quad \text{[Mathematical Formula 10]}$$

Herein, $\psi_{12}(\omega)$ Is a weighting function.

Therefore, the direction of the final sound source can be estimated, as in Mathematical Formula 11, by estimating the time delay $\tau$ maximizing $R_{12}(\tau)$, which is a generalized cross correlation value of Mathematical Formula 10.

$$\hat{\tau} = \arg\max_{\tau\in D} R_{12}(\tau) \quad \text{[Mathematical Formula 11]}$$

<Weighted Generalized Cross Correlation (GCC) Method>

In general, when acquiring a signal, the two microphones are set to be close to each other such that the signal has a smaller value than the wavelength of the lowest frequency domain in order to solve the problem of frequency overlap. Most of the sound energy is distributed in the low frequency domain, and the peak width of the cross correlation value tends to be wider as the affect of the low frequency is larger. As a result, the sound source localization based on the flat cross correlation value has a low performance. In order to overcome such a problem, the cross correlation values are obtained by applying different weighting factors according to frequencies. In the generalized cross correlation, it can be seen that the weighting factor is applied to the frequency component by the two filter values $H_1(\omega)$ and $H_2(\omega)$, and $\psi=H_1H_2'$ is the portion reflecting the weighting factor.

In addition to the simplest weighting function used in the generalized cross correlation GCC, there are several weighting functions that complement the cross correlation values according to the frequency components. Among these weighting functions, the most commonly used weighting function is a phase transform (PHAT). This approach can effectively reduce the magnitudes of the cross correlation values in the portions that need to be suppressed in a simple manner and can provide the same weighting factor for each phase in each frequency band. Based on these properties, the PHAT-based cross-correlation value theoretically is as sharp as the delta function. This is advantageous in finding a sound source in an environment with echo or in find multiple sound sources.

The PHAT weighting function is $$\frac{1}{|G_{X_1X_2}(f)|},$$

where $G_{x_ix_j}(f)=X_i(f)X_j^H(f)$, and i and j are the microphone numbers.

The GCC-PHAT has a high cross-correlation value with respect to the sound source direction and has a relatively sharp peak at in comparison with the GCC.

The GCC-PHAT with the PHAT weighting factor robust to the echo component is sensitive to the existence of noise because the estimation error increases as the effect of the noise power increases when the power of the sound source is actually small.

<Steered Response Power Beamforming>

By using the assumption that the sound source localization method based on the steered response power has a larger energy in the direction in which the sound source exists than the direction in which the sound source does not exist, the output powers of the delay-and-sum beamformer in all possible directions in which the sound source signal can be incident to the microphones are calculated, and the sound source localization is performed with the highest output power.

In the SRP beamforming, the input signals are used for multiple (M) microphones, and each input signal can be expressed as Mathematical Formula 12.

$$x_m(t)=s(t)*h(\vec{d}_s,t), m=1,2,\ldots M \quad \text{[Mathematical Formula 12]}$$

Herein, $s(t)$ is the sound source signal, and $h(\vec{d}_s,t)$ is the impulse response according to the location of the sound source.

FIG. 3 is a diagram illustrating a steered response power algorithm using a delay-and-sum beamforming method. Referring to FIG. 3, since each microphone has a different position, signals input to the microphones have a time difference. At this time, in the steered response power algorithm, a delay-and-sum beamformer acquires an enhanced signal by applying a proper steering delay $\delta_m$ to a signal input to each microphone input and summing all the signals.

FIG. 3 illustrates that all the signals are summed after a certain delay. Since the directions of the signals are concentrated on the position of the sound source, the output is increased as a result. The output of the delay-and-sum can be expressed as Mathematical Formula 13 and Mathematical Formula 14.

$$y(t,\delta_1,\delta_2,\ldots,\delta_M) = \sum_{m=1}^{M} x_m(t-\delta_m) \quad \text{[Mathematical Formula 13]}$$

$$\delta_m = \tau_m - \tau_0 \quad \text{[Mathematical Formula 14]}$$

At this time, the steering delay $\delta_m$ is expressed as the difference between the specific propagation delay $\tau_m$ and the constant $\tau_0$.

By using Mathematical Formula 12, Mathematical Formula 13 is expressed as Mathematical Formula 15, and by Fourier transform, Mathematical Formula 16 is obtained.

$$y(t, \delta_1, \delta_2, \ldots, \delta_M) = \qquad \text{[Mathematical Formula 15]}$$

$$s(t)^* \sum_{m=1}^{M} h(\vec{d}_s, t - \tau_m + \tau_0)$$

$$Y(\omega, \delta_1, \delta_2, \ldots, \delta_M) = \sum_{m=1}^{M} X_m(\omega) e^{-j\omega \delta_m} \qquad \text{[Mathematical Formula 16]}$$

Herein, $X_m(\omega)$ Is the Fourier transform equation of $x_m(t)$.

By adjusting the steering delays $\delta_1, \ldots,$ and $\delta_m$ for each microphone described above, the beamformer output for a specific direction can be obtained. Therefore, the steered response power can be obtained by adjusting the steering delays $\delta_1, \ldots,$ and $\delta_m$ for the respective microphones in accordance with all possible directions in which the sound source signal can be incident to the microphones and obtaining the resulting beamformer output power. This is expressed on the frequency axis as Mathematical Formula 17.

$$P(\delta_1, \delta_2, \ldots, \delta_M) = \int_{-\infty}^{\infty} Y(\omega, \delta_1, \ldots, \delta_M) Y^* (\omega, \delta_1, \ldots, \delta_M) d\omega$$

$$Y^*((\omega, \delta_1, \ldots, \delta_M)\text{:conjugate of } Y((\omega, \delta_1, \ldots, \delta_M), \qquad \text{[Mathematical Formula 17]}$$

Mathematical Formula 17 is expressed as Mathematical Formula 18 by using Mathematical Formula 16.

[Mathematical Formula 18]

$$P(\delta_1, \ldots, \delta_M) = \int_{-\infty}^{\infty} \left( \sum_{k=1}^{M} X_k(\omega) e^{-j\omega \delta_k} \right) \left( \sum_{l=1}^{M} X_l(\omega) e^{-j\omega \delta_l} \right) d\omega =$$

$$\int_{-\infty}^{\infty} \sum_{k=1}^{M} \sum_{l=1}^{M} (X_k(\omega) X_l^*(\omega)) e^{j\omega(\delta_l - \delta_k)} d\omega$$

The relationships such as Mathematical Formula 19 and Mathematical Formula 20 are obtained From Mathematical Formula 14.

$$\delta_l - \delta_k = \tau_l - \tau_k \qquad \text{[Mathematical Formula 19]}$$

$$P(\delta_1, \ldots, \delta_M) = \qquad \text{[Mathematical Formula 20]}$$

$$\int_{-\infty}^{\infty} \sum_{k=1}^{M} \sum_{l=1}^{M} (X_k(\omega) X_l^*(\omega)) e^{j\omega(\tau_l - \tau_k)} d\omega$$

Therefore, the P ($\delta_1, \ldots, \delta_M$) is the steered response power obtained for all microphone pairs according to steering delays $\delta_1, \ldots,$ and $\delta_M$, and by obtaining the steering delays $\delta_1, \ldots,$ and $\delta_M$, such that the steered response power is maximized, the direction is determined. Generally, the steering delays $\delta_1, \ldots,$ and $\delta_N$ are calculated for pairs ($\theta$, $\phi$) of azimuth ($\theta$) and elevation ($\phi$) as possible incident directions from the center of the microphone array, and the steered response powers corresponding to all the pairs ($\theta,\phi$) are calculated. Therefore, the pair ($\theta,\phi$) is determined such that the steered response power is maximized.

In the above Mathematical Formula 20, the result value is greatly influenced by the frequency component having a high signal intensity. Thus, the phase transform (PHAT) applies an additional weighting factor such as Mathematical Formula 21 to each frequency in order to apply equal weighting factor to each frequency.

$$\Psi_{kl}(\omega) = \frac{1}{|X_k(\omega) X_l^*(\omega)|} \qquad \text{[Mathematical Formula 21]}$$

By applying the weighting function and expressing the time delay as $\tau_l - \tau_k = t_{lk}$, Mathematical Formula 22 is obtained.

$$P(\delta_1, \ldots, \delta_M) = \qquad \text{[Mathematical Formula 22]}$$

$$\sum_{k=1}^{M} \sum_{l=1}^{M} \int_{-\infty}^{\infty} \frac{1}{|X_k(\omega) X_l^*(\omega)|} (X_k(\omega) X_l^*(\omega)) e^{j\omega \tau_{lk}} d\omega$$

Therefore, finally, the steering delay is expressed as Mathematical Formula 23, and thus, the direction of the sound source can be determined.

$$\delta_1, \ldots, \delta_M = \mathrm{argmax}_{\delta_1, \ldots, \delta_M} P(\delta_1, \ldots, \delta_M) \qquad \text{[Mathematical Formula 23]}$$

In addition, as a localization method for a pair of microphones, the generalized cross correlation (GCC) method is expressed as Mathematical Formula 24.

$$R_{kl}(\tau) = \frac{1}{2\pi} \int_{-\infty}^{\infty} \Psi_{kl}(\omega)(X_k(\omega) X_k^*(\omega)) e^{j\omega \tau} dw \qquad \text{[Mathematical Formula 24]}$$

In the GCC method, the cross-correlation of the signals incident on the two microphones is used, and the direction of the signal is determined by obtaining the time delay $\tau$ such that the cross-correlation value is maximized. The integral in Mathematical Formula 22 for the SRP can be replaced by a $2\pi$ constant multiplied by Mathematical Formula 22, and as a result, the SRP is an accumulation of the GCC values for all microphone pairs.

SUMMARY OF THE INVENTION

The present invention is to provide a sound source localization method and apparatus robust to echo and noise by using a diffuseness mask.

According to a first aspect of the present invention, there is provided a sound source localization method implemented by execution of a processor of a sound source localization apparatus, including steps of: (a) receiving a mixed signal of a target sound source signal and noise and echo signals through multiple microphones including at least two microphones; (b) generating a mask based on a diffuseness reflecting information on a target sound source and a noise source by using the input signals; (c) pre-processing an input signal to the multiple microphones by using the generated mask; and (d) estimating a direction for the target sound source by performing a predetermined algorithm on the pre-processed input signal.

In the sound source localization method according to the first aspect, it is preferable that, in the step (b) of generating the mask, a coherence-to-diffuseness ratio CDR(l,f) for each frequency frame f and each time frame l is calculated, a diffuseness D(l,f) is calculated by using the coherence-to-diffuseness ratio CDR(l, f), and a binarized mask M is generated by setting a mask value according to the following Mathematical Formula by using the diffuseness D(l, f).

$$MASK = \begin{cases} 1 : D \leq \text{threshold} \\ 0 : D > \text{threshold} \end{cases}$$

In the sound source localization method according to the first aspect, it is preferable that, in the step (c) of pre-processing the input signal, the input signal is binarized by using a binarized mask.

In the sound source localization method according to the first aspect, it is preferable that, the predetermined algorithm in the step (d) is a sound source localization method based on generalized cross correlation (GCC) value or a sound source localization method based on a steered response power SRP.

It is more preferable that the algorithms apply a phase transform (PHAT) scheme for applying a weighting factor $\psi(\omega)$ according to the following Mathematical Formula to signals of each frequency, $$\Psi_{kl}(\omega) = \frac{1}{|X_k(\omega)X_l^*(\omega)|}$$

herein, k and l are the number of the microphone, $\omega=2\pi f$, $X_k(\omega)$ is the Fourier transform value for the input signal of the k-th microphone, and $X_l^*(\omega)$ is the conjugate value of the Fourier transform value.

In the sound source localization method according to the first aspect, it is preferable that, the coherence-to-diffuseness ratio CDR(l,f) for each frequency frame f and each time frame l is estimated according to the following Mathematical Formula by using the coherences for the noise 'n', the target sound source signal 's', and the mixed signal 'x' of the noise and the target sound signal.

$$CDR(l, f) = \frac{\Gamma_n(f) - \Gamma_x(l, f)}{\Gamma_x(l, f) - \Gamma_s(f)}$$

Herein, $\Gamma_n(f)$ is the coherence for the noise 'n', $\Gamma_s(f)$ is the coherence for the target sound source signal 's', and $\Gamma_x(f)$ is the coherence for the mixed signal 'x' of the noise and the target sound source signal 's'.

In the sound source localization method according to the first aspect, it is preferable that, the diffuseness D(l,f) is calculated according to the following Mathematical Formula.

$$D(l, f) = \frac{1}{CDR(l, f) + 1}$$
$$0 \leq D \leq 1$$

According to a second aspect of the present invention, there is provided a sound source localization apparatus having a processor and being operable to estimate a direction of a target sound source by using signals input from multiple microphones by execution of the processor, including: a mixed signal input module which is connected to the multiple microphones and receives a mixed signal of a target sound source signal and noise and echo signals from multiple microphones; a mask generation module which generates and outputs a binarized mask based on a diffuseness by using the mixed signal provided from the mixed signal input module; an input signal pre-processing module which receives the binarized mask from the mask generation module, pre-processes the mixed signal by applying the binarized mask to the mixed signal provided from the mixed signal input module, and outputs the pre-processed mixed signal; and a target direction estimation module which receives the pre-processed mixed signal from the input signal pre-processing module, estimates a direction of the target sound source by performing a predetermined localization algorithm on the mixed signal, and outputs the estimated direction.

In the sound source localization apparatus according to the second aspect, it is preferable that the mask generation module performs: calculating a coherence-to-diffuseness ratio CDR(l,f) for each frequency frame f and each time frame l of the mixed signal provided from the mixed signal input module; calculating a diffuseness D(l,f) by using the coherence-to-diffuseness ratio CDR(l,f); and generating a binarized mask M by setting a mask value according to the following Mathematical Formula by using the diffuseness D(l,f).

$$MASK = \begin{cases} 1 : D \leq \text{threshold} \\ 0 : D > \text{threshold} \end{cases}$$

In the sound source localization apparatus according to the second aspect, it is preferable that the predetermined localization algorithm of the target direction estimation module is a sound source localization method based on a generalized cross correlation (GCC) value or a sound source localization method based on a steered response power SRP.

In the sound source localization apparatus according to the second aspect, it is preferable that the coherence-to-diffuseness ratio CDR(l,f) for each frequency frame f and each time frame l is estimated according to the following Mathematical Formula by using the coherences for the noise 'n', the target sound source signal 's', and the mixed signal 'x' of the noise and the target sound signal.

$$CDR(l, f) = \frac{\Gamma_n(f) - \Gamma_x(l, f)}{\Gamma_x(l, f) - \Gamma_s(f)}$$

Herein, $\Gamma_n(f)$ is the coherence for the noise 'n', $\Gamma_s(f)$ is the coherence for the target sound source signal 's', and $\Gamma_x(f)$ is the coherence for the mixed signal 'x' of the noise and the target sound source signal 's'.

According to a sound source localization method according to the present invention, by applying a CDR-based binarized mask to an input signal, even if noise and echo are increased, the accuracy is increased, and thus, the performance is robust to the noise and echo in comparison with other algorithms in the related art.

DETAILED DESCRIPTION

Figure 1:
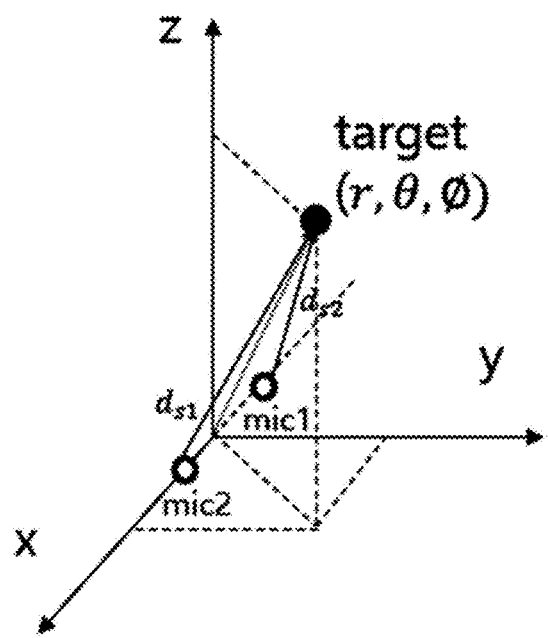
FIG. 1 is a graph illustrating time delays in which sound signals from a sound source in a spherical coordinate system arrives at multiple microphones according to angles.
Figure 2:
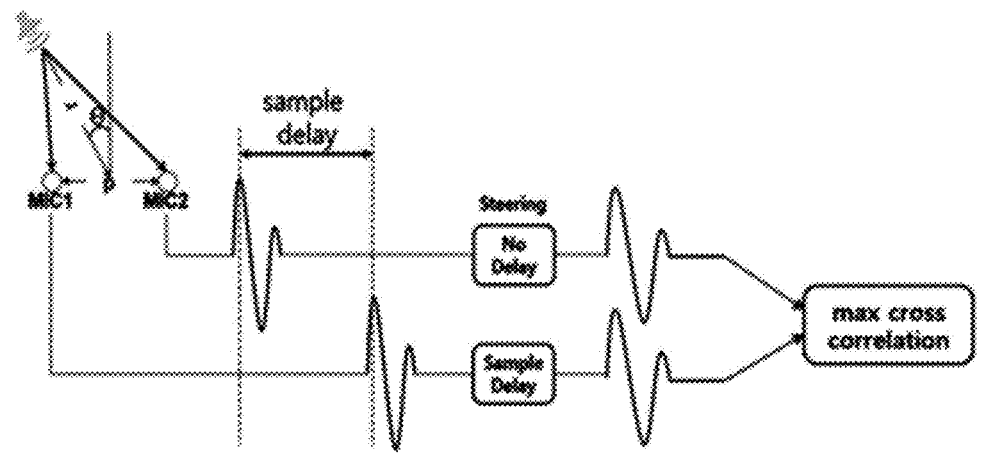
FIG. 2 is a diagram illustrating cross correlation values when delay compensation is performed.
Figure 3:
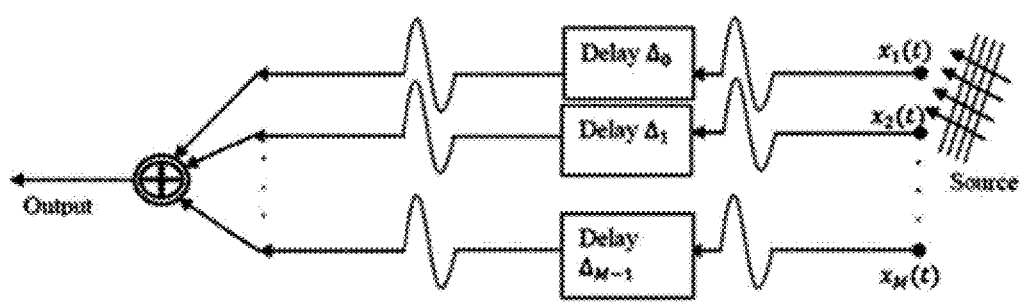
FIG. 3 is a diagram illustrating a steered response power algorithm using a delay-and-sum beamforming method in the related art.

A sound source localization method and apparatus according to the present invention generates a binarized mask based on a diffuseness reflecting information on a target sound source and a noise source in a direction and a noise environment, converts an input signal by using the generated binarized mask, and applies a GCC-PHAT or a SRP-PHAT based on a cross correlation method to the converted input signal to estimate the direction of the target sound source.

Hereinafter, a sound source localization method and apparatus according to a preferred embodiment of the present invention will be described in detail. The sound source localization method according to the present invention can be implemented by a processor such as a CPU of the sound source localization apparatus.

In addition, the present invention also includes a computer-readable nonvolatile recording medium that stores program commands including operations for executing the above-described sound source localization method, and the program commands recorded on the recording medium can be executed by the processor of the sound source localization apparatus.

As in Mathematical Formula 25, the signal-to-noise ratio SNR, which is the power ratio of the target sound source signal to the noise, is expressed by the ratio of the auto-correlation value $\Phi_s(l,f)$ of the target sound source to the auto-correlation value $\Phi_n(l,f)$ of the noise source. In this case, the auto-correlation value $\Phi_s(l,f)$ of the target sound source and the auto-correlation value $\Phi_n(l,f)$ of the noise source can be expressed as Mathematical Formula 25 for the environment where a noise and a late echo exist.

$$SNR(l,f) = \frac{\Phi_s(l,f)}{\Phi_n(l,f)} \quad \text{[Mathematical Formula 25]}$$

$$\Phi_{s_1 s_1}(l,f) = \Phi_{s_2 s_2}(l,f) = \Phi_s(l,f)$$

$$\Phi_{n_1 n_1}(l,f) = \Phi_{n_2 n_2}(l,f) = \Phi_n(l,f)$$

$\Phi$: correlation value $\Phi_{s_1 s_1}(l,f)$: auto-correlation value of target sound source $\Phi_{n_1 n_1}(l,f)$: auto-correlation value of noise source Where l denotes a time frame, and f denotes a frequency bin.

Next, the diffuseness D is measured by Mathematical Formula 26. Herein, $P_{pw}$ denotes a plane wave phasor, and $P_{diff}$ denotes a diffusive noise phasor. The plane wave and the diffusive noise can be distinguished by coherence. Theoretically, the coherence of the plane wave corresponds to 1, and the coherence of the diffusive noise corresponds to 0. The diffuseness D is expressed by a value ranging from 0 to 1. The larger the value, the higher the diffuseness. The smaller the value, the lower the diffuseness.

On the other hand, the coherence-to-diffuseness ratio CDR can be expressed as Mathematical Formula 27. The coherence-to-diffuseness ratio CDR is the same as that of the case where it assumed that the target sound source is a plane wave and the noise is a diffusive noise in the signal-to-noise SNR. In other words, the coherence-to-diffuseness ratio CDR can be regarded as the ratio of a signal with a low coherence to a signal with a high coherence.

$$D = \frac{E[|P_{diff}|^2]}{E[|P_{diff}|^2] + E[|P_{pw}|^2]} \quad \text{[Mathematical Formula 26]}$$

$$CDR = \frac{E[|P_{pw}|^2]}{E[|P_{diff}|^2]} \quad \text{[Mathematical Formula 27]}$$

$E[|P_{pw}|^2]$: power of plane wave $E[|P_{diff}|^2]$: power of diffusive noise Therefore, since a sound signal is a signal with a high coherence and a diffusive noise as a target noise of the present invention is a signal with a low coherence, the coherence-to-diffuseness ratio CDR can be used in the same manner as the signal-to-noise SNR. In this case, as illustrated in Mathematical Formula 28, when there are input signals $x_1(t)$ and $x_2(t)$ incoming to the two microphones, the coherence is defined as the value by normalizing the cross correlation value $\Phi_{x_1 x_2}$ for this signal by the auto-correlation value of the signal. Thus, it can be understood that the coherence is independent of time, in a case where it is assumed that the signal enters in a certain direction without being affected by the change in size of the sound source over time. Therefore, the coherence can only reflect spatial characteristics while excluding temporal characteristics for the target sound source and the noise source in comparison with the cross correlation values. That is, the formula of the coherence can be defined according to the spatial characteristics of each target signal and the noise signal. Therefore, when the coherence-to-diffuseness ratio CDR is expressed by the coherence for the mixed signal, the coherence for the target source, and the coherence for the noise source rather than the cross correlation value, the time domain and the frequency domain in which the signal is dominant in comparison with the noise can be estimated through the mixed signal.

$$\Gamma_{x_1 x_2}(f) = \frac{\Phi_{x_1 x_2}(l,f)}{\sqrt{\Phi_{x_1 x_1}(l,f) * \Phi_{x_2 x_2}(l,f)}} \quad \text{[Mathematical Formula 28]}$$

According to the definition of the coherence according to Mathematical Formula 28, the coherence for the target sound source 's' and the noise source 'n' can be expressed as Mathematical Formula 29, respectively.

$$\Gamma_s(f) = \frac{\Phi_{s_1 s_2}(l, f)}{\Phi_s(l, f)}, \quad \text{[Mathematical Formula 29]}$$

$$\Gamma_n(f) = \frac{\Phi_{n_1 n_2}(l, f)}{\Phi_n(l, f)}$$

Next, the coherence for the input signal x(t) can be expressed as Mathematical Formula 30, which can be expressed by Mathematical Formula 31 and Mathematical Formula 32 with respect to the coherence-to-diffusiveness rate CDR, and the coherence-to-diffusiveness rate CDR can be expressed by Mathematical Formula 33 by using the coherence for each signal.

$$\Gamma_x(l, f) = \quad \text{[Mathematical Formula 30]}$$

$$\frac{\Phi_{x_1 x_2}(l, f)}{\Phi_x(l, f)} = \frac{\Phi_{s_1 s_2}(l, f) + \Phi_{n_1 n_2}(l, f)}{\Phi_s(l, f) + \Phi_n(l, f)} =$$

$$\frac{\frac{\Phi_s(l, f)}{\Phi_n(l, f)} * \frac{\Phi_{s_1 s_2}(l, f)}{\Phi_s(l, f)} + \frac{\Phi_{n_1 n_2}(l, f)}{\Phi_n(l, f)}}{\frac{\Phi_s(l, f)}{\Phi_n(l, f)} + 1}$$

$$\Gamma_x(l, f) = \frac{SNR(l, f)\Gamma_s(f) + \Gamma_n(f)}{SNR(l, f) + 1} \quad \text{[Mathematical Formula 31]}$$

$$\Gamma_x(l, f) = \quad \text{[Mathematical Formula 32]}$$

$$\Gamma_s(f) + \frac{1}{CDR(l, f) + 1}(\Gamma_n(f) - \Gamma_s(f))$$

$$CDR(l, f) = \frac{\Gamma_n(f) - \Gamma_x(l, f)}{\Gamma_x(l, f) - \Gamma_s(f)} \quad \text{[Mathematical Formula 33]}$$

In addition, the diffuseness D according to Mathematical Formula 26 can be expressed as Mathematical Formula 34 by using the coherence.

$$D(l, f) = \frac{1}{CR(l, f) + 1} \quad \text{[Mathematical Formula 34]}$$

$$0 \leq D \leq 1$$

Hereinafter, a sound source localization apparatus implemented by applying the sound source localization method according to the embodiment of the present invention will be described in detail.

Figure 6:
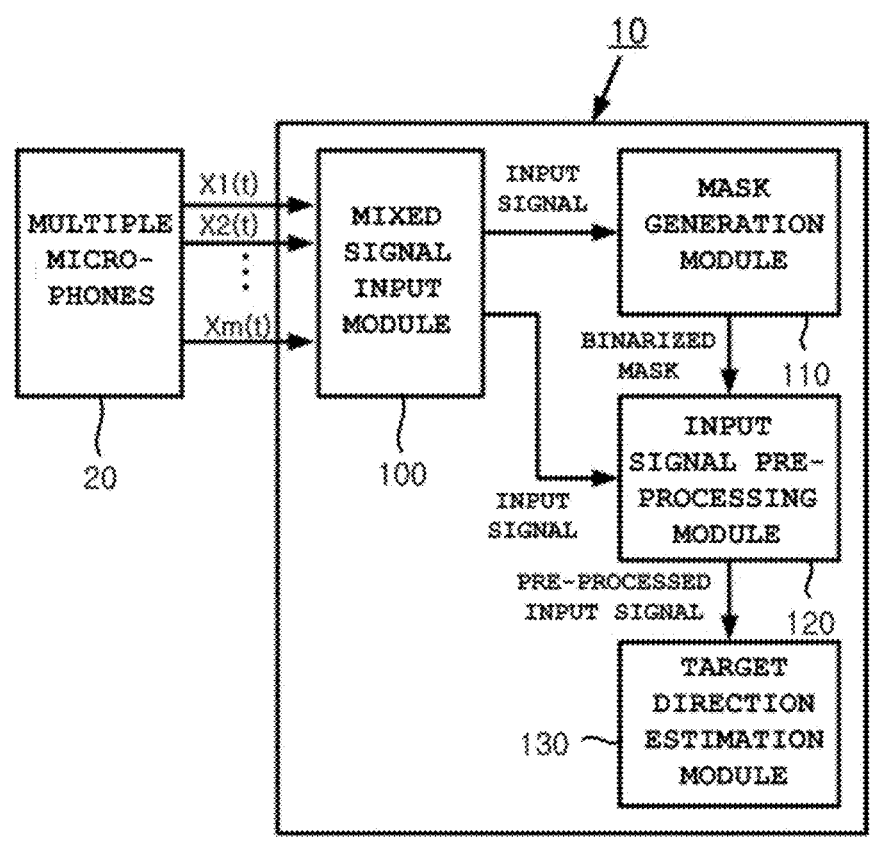
FIG. 6 is a block diagram illustrating a sound source localization apparatus implemented by applying the sound source localization method according to the embodiment of the present invention.

FIG. 6 is a block diagram illustrating an entire sound source localization apparatus implemented by applying the sound source localization method according to the embodiment of the present invention. Referring to FIG. 6, the sound source localization apparatus 10 according to the present invention includes a mixed signal input module 100, a mask generation module 110, an input signal pre-processing module 120, and a target direction estimation module 130. Each module of the sound source localization apparatus is a module operated by a processor such as a CPU of the sound source localization apparatus.

The sound source localization apparatus 10 according to the present invention having the above-described configuration is connected to the multiple microphones 20 configured with the M microphones and estimates the direction of the target sound source by using the signals input from multiple microphones.

The mixed signal input module 100 is connected to the multiple microphones and is input with mixed signals of the target sound source signals, the noise signals, and the echo signals from multiple microphones.

The mask generation module 110 generates and outputs a binarized mask M based on the diffuseness by using the mixed signal provided from the mixed signal input module. The operation of the mask generation module will be described later in detail.

The input signal pre-processing module 120 receives the binarized mask from the mask generation module and pre-processes and outputs the mixed signal by applying the binarized mask to the mixed signal provided from the mixed signal input module.

The target direction estimation module 130 receives the pre-processed mixed signal from the input signal pre-processing module and estimates and outputs the direction of the target sound source by using the GCC algorithm or the SRP algorithm for the mixed signal or using the GCC-PHAT algorithm or the SRP-PHAT algorithm applying a phase transform weighting function.

Hereinafter, a method of generating the binarized mask using by the diffuseness used in the sound source localization method according to the present invention will be described in detail. On the other hand, the mask generation module 110 of the sound source localization apparatus 10 according to the present invention is implemented by applying the following binarized mask generation method.

In the present invention, the binarized mask based on the diffuseness is used such that the direction can be estimated at the time and frequency in which the target sound source is dominant according to the diffuseness value.

First, the definition of the coherence for the target sound source, the noise, and the echo will be described in detail.

Figure 4:
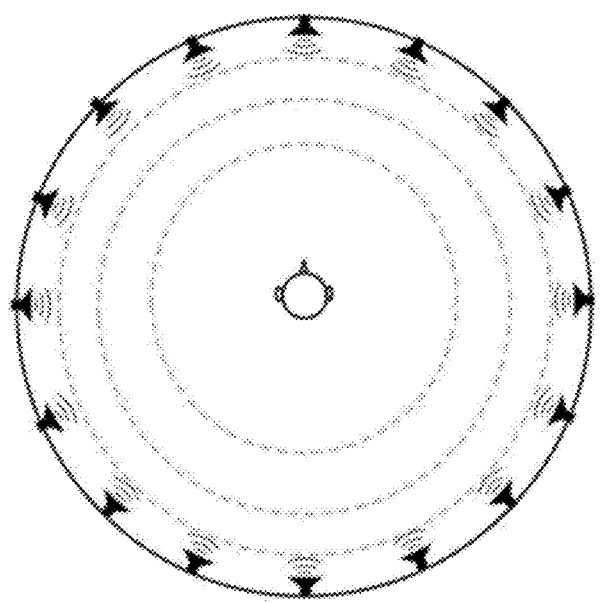
FIG. 4 is a diagram illustrating an exemplary configuration of a diffusive noise.

In a case where the target sound source signal is input to the microphone with the arrival direction of θ at long-distance The coherence for the target sound source can be expressed as Mathematical Formula 35.

$$\Gamma_s(f) = \frac{\Phi_{s_1 s_2}(l, f)}{\Phi_s(l, f)} = e^{j 2\pi f \Delta t} = e^{jkd \sin(\theta)} \quad \text{[Mathematical Formula 35]}$$

$$\Delta t = \frac{d \sin(\theta)}{c}, \quad k = \frac{2\pi f}{c},$$

d: distance between microphones, c: speed of sound, θ: direction of sound source Next, in a case of considering an environmental background noise, it is assumed that the signal is a superposition of non-correlated noises of which the number is usually infinite. This noise is input from all directions when the microphone exists spatially at the center of a circular form. That is, the noise sources are evenly distributed from all directions away from the microphone, which results in no correlation in the input signal. This noise is called a diffusive noise or an isotropic noise. Most experimentally, when generating such a diffusive noise, a large number of non-correlated noise sources are arranged in all directions as illustrated in FIG. 4. FIG. 4 is a diagram illustrating an exemplary configuration of the diffusive noise.

The coherence for the diffusive noise is defined as Mathematical Formula 36 for two microphones $$\Gamma_{\textit{diffuse}}(f) = \quad \text{[Mathematical Formula 36]}$$

$$\frac{\Phi_{n_1 n_2}(l, f)}{\Phi_n(l, f)} = \frac{\sin(kd)}{kd} = \frac{\sin\left(2\pi f \frac{d}{c}\right)}{2\pi f \frac{d}{c}}$$

Figure 5:
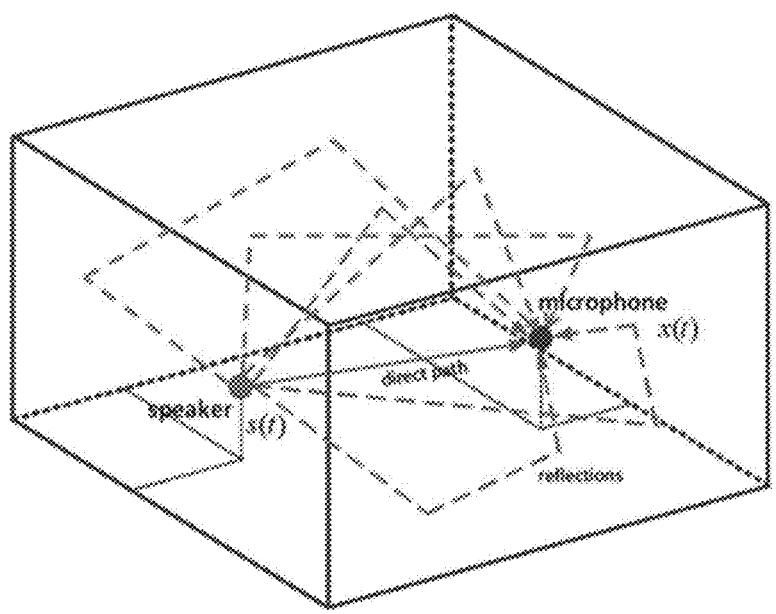
FIG. 5 is an exemplary diagram illustrating an input path of an input signal in an echo environment.

On the other hand, in the case of the echo signals, it is generally assumed that a convolution of the RIR (Room Impulse Response) and the target source is input. At this time, since the echo signals collide with obstacles in the recording environment as illustrated in FIG. 5 and enter the microphone with different time differences and attenuated sizes through various reflection paths, the echo signals have isotropic characteristics similar to those of the diffusive noise. Thus, a late echo signal can be treated the same as the diffusive noise. FIG. 5 is an exemplary diagram illustrating an input path of an input signal in an echo environment.

First, the auto-correlation values and the cross correlation values between the two microphones required to obtain the coherence-to-diffuseness ratio CDR values are recursively calculated as expressed by Mathematical Formula 37 to obtain an average value for each time. In this case, λ is a constant value between 0 and 1.

$$\hat{\Phi}_{x_p x_j}(l,f) = \lambda \hat{\Phi}_{x_p x_j}(l-1,f) + (1-\lambda) X_i(l,f) X^*_j(l,f)$$ [Mathematical Formula 37]

In addition, to determine the coherence-to-diffuseness ratio CDR expressed by Mathematical Formula 33, it is assumed as expressed by Mathematical Formula 38 that the coherence of the target sound source is set to 1, and Mathematical Formula 39 is obtained from Mathematical Formula 38. By using the Mathematical Formula 39, the coherence-to-diffuseness ratio CDR in the case where the direction of the target sound source is unknown is obtained from Mathematical Formula 40. In Mathematical Formula 40, the reason for taking the maximum value between 0 and 1 to determine the coherence-to-diffuseness ratio CDR is to prevent the coherence-to-diffuseness ratio CDR from taking a negative value.

$$|\Gamma_s(f)| = |\Gamma_x(l,f) - (\Gamma_n(f) - \Gamma_x(l,f)) CDR(l,f)^{-1}| \stackrel{\Delta}{=} 1$$ [Mathematical Formula 38]

$$(|\Gamma_x(l,f)|^2 - 1) CDR(l,f)^2 - 2\mathrm{Re}\{\Gamma_x(l,f)(\Gamma_n(f) - \Gamma_x(l,f))^*\} CDR(l,f) + |\Gamma_n(f) - \Gamma_x(l,f)|^2 = 0$$ [Mathematical Formula 39]

$$\widetilde{CDR}_{noDOA}(l,f) = \max\left(0, \frac{\tilde{\Gamma}^*_n(f)\mathrm{Re}(\tilde{\Gamma}_x(l,f))) - |\tilde{\Gamma}_x(l,f)|^2 - \sqrt{\tilde{\Gamma}^2_n(f)\mathrm{Re}(\tilde{\Gamma}_x(l,f)) - \tilde{\Gamma}^2_n(f)|\tilde{\Gamma}_n(f)|^2} + 2\tilde{\Gamma}^2_n(f) - 2\tilde{\Gamma}_n(f)\mathrm{Re}\{\tilde{\Gamma}_x(l,f)\} + |\hat{\Gamma}_x(l,f)|^2}{(|\hat{\Gamma}_x(l,f)|^2 - 1)}\right)$$ [Mathematical Formula 40]

Finally, the value of diffuseness D is expressed as Mathematical Formula 41 and has a value between 0 and 1, as mentioned above.

$$D(l,f) = \frac{1}{1 + \widetilde{CDR}_{noDOA}(l,f)}$$ [Mathematical Formula 41]

Generally, in the noise removing and echo removing algorithms, when a noise source is removed by using a mask, a distortion of the target sound source is generated, which deteriorates the performance of the voice recognition rate. Therefore, even if the performance of the noise removing or echo removing is somewhat deteriorates, the masking is performed under the condition that no distortion occurs in the original signal. However, in the present invention, since the robust sound source localization using the coherence-to-diffuseness ratio CDR is performed by providing the information on noise and echo rather than the noise removing or the echo removing, it can be concluded that the removing as much noise as possible within such a range that a phase difference between the two microphones of the target sound source is preserved leads to a clearer cross correlation value in the target sound source. Therefore, the value of the diffuseness D having a linear value such as Mathematical Formula 42 is binarized by setting the threshold value.

$$\mathrm{MASK} = \begin{cases} 1: D \le \text{threshold} \\ 0: D > \text{threshold} \end{cases}$$ [Mathematical Formula 42]

In this case, it is preferable that the threshold value is set to a value having the highest accuracy with respect to the target sound source estimation through experiments.

Figure 7A:
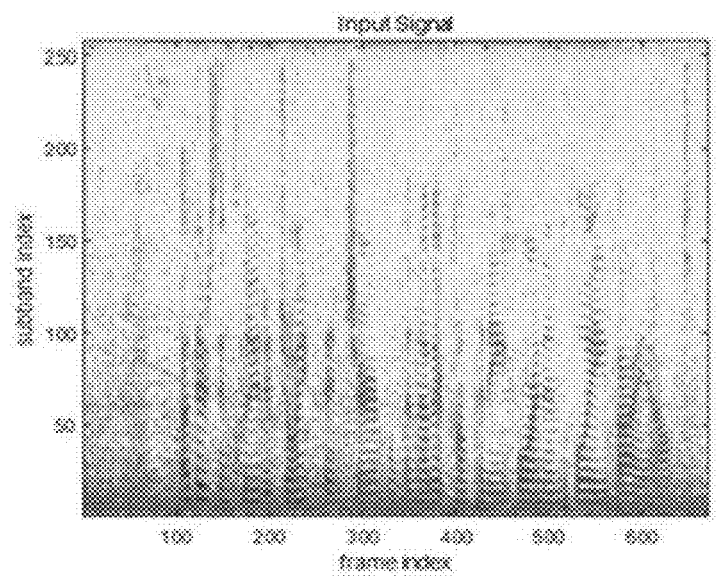
FIGS. 7A, 7B, and 7C are graphs illustrating an input mixed signal, an estimated CDR, and a binarized mask, respectively, in the sound source localization method according to the embodiment of the present invention.
Figure 7B:
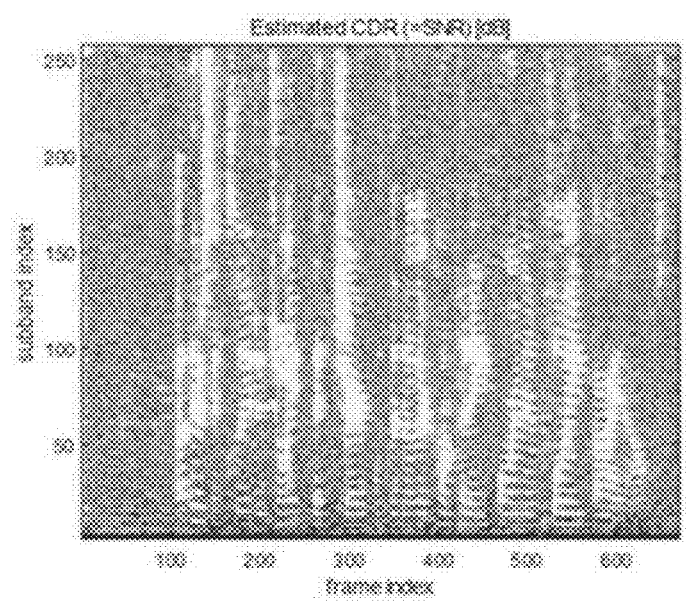
Figure 7C:
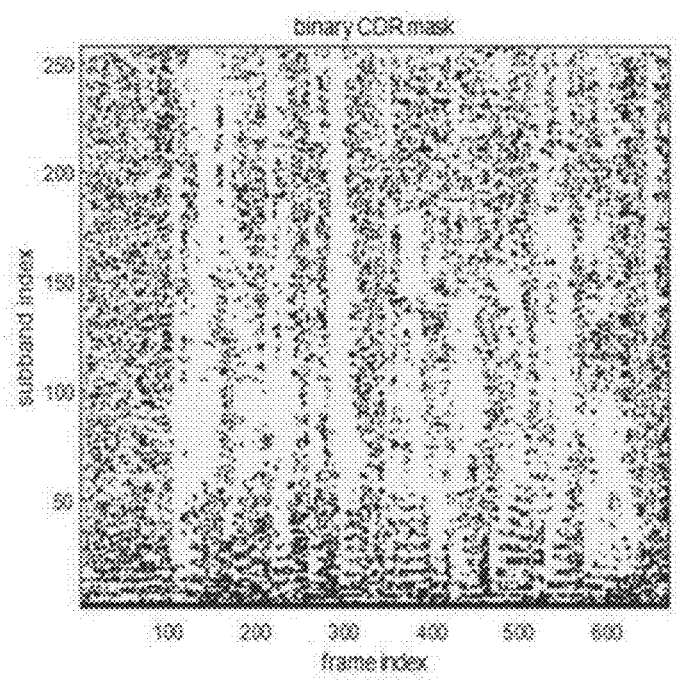

As described above, the sound source localization robust to the echo and the noise can be implemented by performing the GCC-PHAT or the SRP-PHAT by applying the binarized mask generated by using the diffuseness measured by using the coherence-to-diffuseness ratio CDR to the signal input to the microphone, FIGS. 7A, 7B, and 7C are graphs illustrating an input mixed signal, an estimated CDR, and a binarized mask, respectively, in the sound source localization method according to the embodiment of the present invention. Referring to FIG. 7, it can be seen that the time and frequency in which the sound signal exists are detected while illustrating a dominant value in the region where the target signal exists.

Figure 8A:
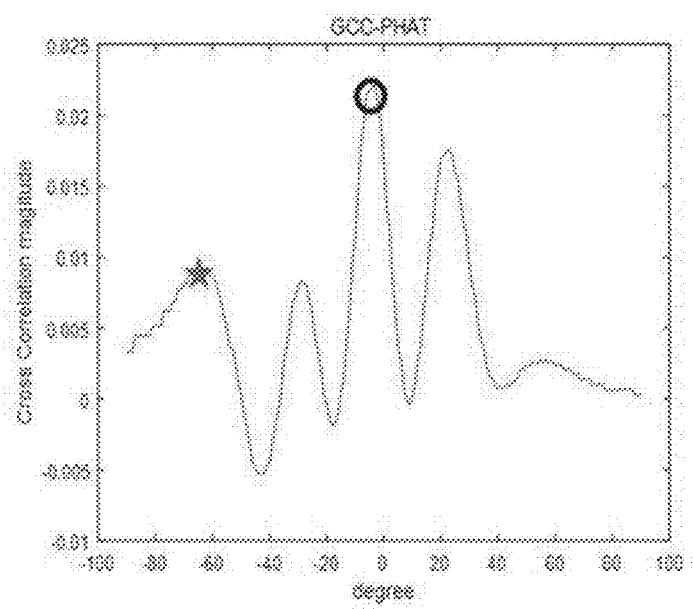
FIGS. 8A and 8B are graphs illustrating the performance of the sound source localization method according to the embodiment of the present invention in comparison with a method in the related art.
Figure 8B:
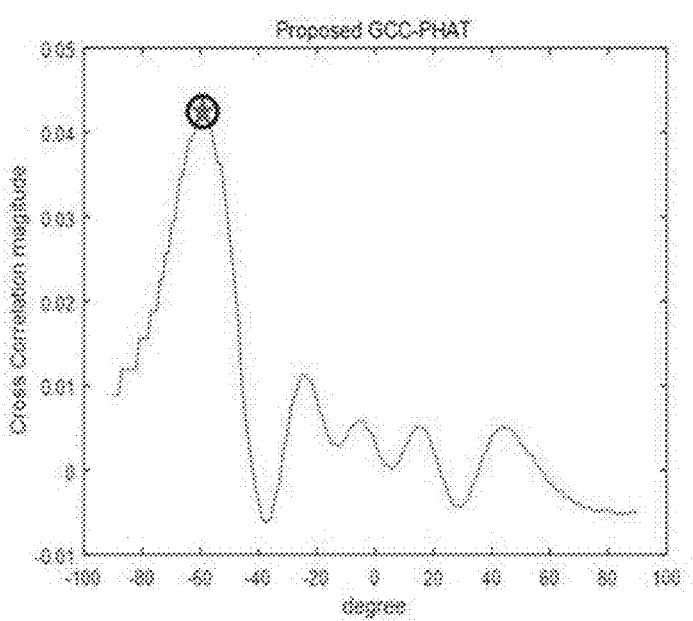

FIG. 8 is a graph illustrating the performance of the sound source localization method according to the embodiment of the present invention in comparison with a method in the related art. FIG. 8A is a graph illustrating a frame erroneously detected as a result of the GCC-PHAT according to the method in the related art, and FIG. 8B is a graph illustrating a result of the GCC-PHAT using the masking technique according to the present invention. Referring to FIG. 8, although the direction of the target sound source is erroneously detected in the method in the related art, it can be seen that the direction can be correctly detected in the present invention.

On the other hand, as described above, the SRP-PHAT is equivalent to application of the GCC-PHAT algorithm applied to the two microphones to multiple microphones. In addition, in terms of Mathematical Formula, the SRP-PHAT is the sum of the GCC-PHAT for all microphone pairs. Therefore, when only two microphones are used, the SRP-PHAT and the GCC-PHAT have the same result. Accordingly, in the localization method according to the present invention, the direction of the target sound source can be estimated by applying the binarized mask generated by using the diffuseness to the input signal, and after that, by using the SRP-PHAT as well as the GCC-PHAT.

While the present invention has been particularly illustrated and described with reference to exemplary embodiments thereof, it should be understood by the skilled in the art that the invention is not limited to the disclosed embodiments, but various modifications and applications not illustrated in the above description can be made without departing from the spirit of the invention. In addition, differences relating to the modifications and applications should be construed as being included within the scope of the invention as set forth in the appended claims.

What is claimed is:

1. A sound source localization method implemented by execution of a processor of a sound source localization apparatus, comprising steps of:
   (a) receiving a mixed signal of a target sound source signal and a noise signal through multiple microphones including at least two microphones;
   (b) generating a mask based on a diffuseness reflecting information on a target sound source and a noise source by using the mixed signal;
   (c) pre-processing the mixed signal received to the multiple microphones by using the generated mask; and
   (d) estimating a direction for the target sound source by performing a predetermined algorithm on the pre-processed mixed signal.

2. The sound source localization method according to claim 1, wherein, in the step (b) of generating the mask,
   a coherence-to-diffuseness ratio CDR(l,f) for each frequency frame f and each time frame l is calculated,
   a diffuseness D(l,f) is calculated by using the coherence-to-diffuseness ratio CDR(l,f), and
   a binarized mask M is generated by setting a mask value according to the following Mathematical Formula by using the diffuseness D(l,f), $$MASK = \begin{cases} 1 : D \leq \text{threshold} \\ 0 : D > \text{threshold} \end{cases}.$$

3. The sound source localization method according to claim 2, wherein, in the step (c) of pre-processing the mixed signal, the mixed signal is binarized by using a binarized mask.

4. The sound source localization method according to claim 1, wherein the predetermined algorithm in the step (d) is a sound source localization method based on generalized cross correlation (GCC) value or a sound source localization method based on a steered response power SRP.

5. The sound source localization method according to claim 4, wherein the predetermined algorithm applies a phase transform (PHAT) scheme for applying a weighting factor $\psi(\omega)$ according to the following Mathematical Formula to signals of each frequency, $$\psi_{kl}(\omega) = \frac{1}{|X_k(\omega)X_l^*(\omega)|}$$

herein, k and l are the number of the microphone, $\omega = 2\pi f$, $X_k(\omega)$ is a Fourier transform value for a signal being input to k-th microphone, and $X_l^*(\omega)$ is a conjugate value of the Fourier transform value.

6. The sound source localization method according to claim 2, wherein the coherence-to-diffuseness ratio CDR(l,f) for each frequency frame f and each time frame l is estimated according to the following Mathematical Formula by using a coherence for the noise signal 'n', the target sound source signal 's', and the mixed signal 'x' of the noise signal and the target sound signal, $$CDR(l, f) = \frac{\Gamma_n(f) - \Gamma_x(l, f)}{\Gamma_x(l, f) - \Gamma_s(f)}$$

herein, $\Gamma_n(f)$ is the coherence for the noise signal 'n', $\Gamma_s(f)$ is the coherence for the target sound source signal 's', and $\Gamma_x(f)$ is the coherence for the mixed signal 'x' of the noise signal and the target sound source signal 's'.

7. The sound source localization method according to claim 2, wherein the diffuseness D(l,f) is calculated according to the following Mathematical Formula, $$D(l, f) = \frac{1}{CDR(l, f) + 1}$$

$0 \leq D \leq 1$.

8. A sound source localization apparatus having a processor and being operable to estimate a direction of a target sound source by using signals input from multiple microphones by execution of the processor, comprising:
   a mixed signal input module which is connected to the multiple microphones and receives mixed signals of a target sound source signal and a noise signal from the multiple microphones;
   a mask generation module which generates and outputs a binarized mask based on a diffuseness by using the mixed signal provided from the mixed signal input module;
   an input signal pre-processing module which receives the binarized mask from the mask generation module, pre-processes the mixed signal by applying the binarized mask to the mixed signal provided from the mixed signal input module, and outputs the pre-processed mixed signal; and
   a target direction estimation module which receives the pre-processed mixed signal from the input signal pre-processing module, estimates a direction of the target sound source by performing a predetermined localization algorithm on the pre-processed mixed signal, and outputs the estimated direction.

9. The sound source localization apparatus according to claim 8, wherein the mask generation module performs:
   calculating a coherence-to-diffuseness ratio CDR(l,f) for each frequency frame f and each time frame l of the mixed signal provided from the mixed signal input module;
   calculating a diffuseness D(l,f) by using the coherence-to-diffuseness ratio CDR(l,f); and generating a binarized mask M by setting a mask value according to the following Mathematical Formula by using the diffuseness D(l,f), $$MASK = \begin{cases} 1 : D \leq \text{threshold} \\ 0 : D > \text{threshold} \end{cases}.$$

10. The sound source localization apparatus according to claim 8, wherein the predetermined localization algorithm of the target direction estimation module is a sound source localization method based on a generalized cross correlation (GCC) value or a sound source localization method based on a steered response power SRP.

11. The sound source localization apparatus according to claim 9, wherein the coherence-to-diffuseness ratio CDR(l,f) for each frequency frame f and each time frame l is estimated according to the following Mathematical Formula by using a coherence for the noise signal 'n', the target sound source signal 's', and the mixed signal 'x' of the noise signal 'n' and the target sound signal, $$CDR(l, f) = \frac{\Gamma_n(f) - \Gamma_x(l, f)}{\Gamma_x(l, f) - \Gamma_s(f)}$$

herein, $\Gamma_n(f)$ is the coherence for the noise signal 'n', $\Gamma_s(f)$ is the coherence for the target sound source signal 's', and $\Gamma_x(f)$ is the coherence for the mixed signal 'x' of the noise signal 'n' and the target sound source signal 's'.

\* \* \* \* \*